United States Patent
Hwang et al.

(10) Patent No.: US 12,264,244 B2
(45) Date of Patent: Apr. 1, 2025

(54) POLYESTER RESIN BLEND

(71) Applicant: SK CHEMICALS CO., LTD., Gyeonggi-do (KR)

(72) Inventors: Da-Young Hwang, Gyeonggi-do (KR); Yoo Jin Lee, Gyeonggi-do (KR)

(73) Assignee: SK Chemicals CO., Ltd., Gyeonggi-do (KR)

(*) Notice: Subject to any disclaimer, the term of this patent is extended or adjusted under 35 U.S.C. 154(b) by 494 days.

(21) Appl. No.: 17/613,859

(22) PCT Filed: May 28, 2020

(86) PCT No.: PCT/KR2020/006925
§ 371 (c)(1),
(2) Date: Nov. 23, 2021

(87) PCT Pub. No.: WO2021/040194
PCT Pub. Date: Mar. 4, 2021

(65) Prior Publication Data
US 2022/0227992 A1    Jul. 21, 2022

(30) Foreign Application Priority Data
Aug. 27, 2019  (KR) .................. 10-2019-0105176
May 26, 2020  (KR) .................. 10-2020-0062919

(51) Int. Cl.
*C08L 67/02*    (2006.01)
(52) U.S. Cl.
CPC ........... *C08L 67/02* (2013.01); *C08L 2205/02* (2013.01)
(58) Field of Classification Search
CPC .. C08G 63/183; C08G 63/199; C08G 63/672; C08L 2205/02; C08L 2205/025; C08L 2205/03; C08L 2205/035; C08L 67/02
See application file for complete search history.

(56) References Cited

U.S. PATENT DOCUMENTS

| | | | |
|---|---|---|---|
| 6,140,422 | A | 10/2000 | Khanarian et al. |
| 6,359,070 | B1 | 3/2002 | Khanarian et al. |
| 2009/0181196 | A1 | 7/2009 | Pecorini et al. |
| 2011/0015348 | A1 | 1/2011 | Hwang et al. |
| 2011/0071235 | A1 | 3/2011 | Kannan et al. |
| 2012/0157636 | A1 | 6/2012 | Neill et al. |
| 2013/0029068 | A1 | 1/2013 | Treece et al. |
| 2014/0010982 | A1 | 1/2014 | Neill et al. |
| 2014/0316037 | A1 | 10/2014 | Kannan et al. |
| 2017/0233525 | A1 | 8/2017 | Kulkarni et al. |
| 2020/0087450 | A1 | 3/2020 | Lee et al. |
| 2020/0172662 | A1 | 6/2020 | Lee et al. |
| 2022/0227922 | A1 | 7/2022 | Hwang et al. |
| 2022/0380595 | A1 | 12/2022 | Lee et al. |

FOREIGN PATENT DOCUMENTS

| | | | |
|---|---|---|---|
| EP | 3912815 | 11/2021 | |
| JP | H11-323107 | 11/1999 | |
| JP | 2002-512289 | 4/2002 | |
| JP | WO 2006/062075 | 6/2008 | |
| JP | 2010-065348 | 3/2010 | |
| JP | 2011-511102 | 4/2011 | |
| JP | 4771204 | 9/2011 | |
| JP | 2012-126821 | 7/2012 | |
| JP | 5664201 | 2/2015 | |
| JP | 5801856 | 10/2015 | |
| JP | 2017-170902 | 9/2017 | |
| JP | 2018076427 A | * 5/2018 | |
| JP | 7431862 | 2/2024 | |
| KR | 10-2008-0056470 | 6/2008 | |
| KR | 10-2009-0077219 | 7/2009 | |
| KR | 10-2009-0106548 | 10/2009 | |
| KR | 10-2012-0114507 | 10/2012 | |
| KR | 10-2013-0044867 | 5/2013 | |
| KR | 10-2014-0063636 | 5/2014 | |
| KR | 10-2015-0038014 | 4/2015 | |
| KR | 10-2015-0066384 | 6/2015 | |
| KR | 10-2017-0076558 | 7/2017 | |
| KR | 10-2017-0083421 | 7/2017 | |
| TW | 201906893 | 2/2019 | |
| WO | WO 2006/062075 | 6/2006 | |
| WO | WO-2013062286 A1 | * 5/2013 | .............. C08L 67/02 |
| WO | WO 2018/236111 | 12/2018 | |

OTHER PUBLICATIONS

WO-2013062286-A1 machine translation (May 2, 2013).*
JP-2018076427-A machine translation (May 17, 2018).*
International Search Report and Written Opinion for International (PCT) Patent Application No. PCT/KR2020/006925, dated Aug. 28, 2020, 7 pages.
English Translation of the International Search Report for International (PCT) Patent Application No. PCT/KR2020/006925, dated Aug. 28, 2020, 2 pages.
Extended Search Report for European Patent Application No. 20858684.2, dated Aug. 21, 2023, 6 pages.
English Translation of the International Search Report for International (PCT) Patent Application No. PCT/KR2020/006918, dated Sep. 10, 2020, 2 pages.
Official Action for U.S. Appl. No. 17/613,813, dated Jul. 15, 2024 15 pages.

* cited by examiner

*Primary Examiner* — Ana L. Woodward
(74) *Attorney, Agent, or Firm* — Sheridan Ross, PC

(57) ABSTRACT

The present disclosure relates to a polyester resin blend. The polyester resin blend exhibits excellent miscibility even if it contains recycled polyethylene terephthalate as well as virgin polyethylene terephthalate, and can provide molded articles with high transparency.

12 Claims, No Drawings

POLYESTER RESIN BLEND

CROSS REFERENCE TO RELATED APPLICATIONS

This application is a national stage application under 35 U.S.C. 371 and claims the benefit of PCT Application No. PCT/KR2020/006925 having an international filing date of 28 May 2020, which designated the United States, and which PCT application claimed the benefit of South Korea Patent Application No. 10-2019-0105176 filed 27 Aug. 2019, and South Korea Patent Application No. 10-2020-0062919 filed 26 May 2020, the contents of each of which are incorporated herein by reference in their entireties.

TECHNICAL FIELD

The present disclosure relates to a polyester resin blend.

BACKGROUND OF ART

Waste plastics, which account for about 70% of marine pollution, have recently emerged as a serious social problem, and each country regulates the use of disposable plastics while promoting reuse of waste plastics. Currently, waste plastics are collected, crushed and washed, and then melt-extruded and re-pelletized to be reused as raw materials. However, it is very difficult to provide good-quality plastic products due to foreign substances in the waste plastics. Accordingly, research on producing good-quality plastic products from waste plastics is urgently needed.

PRIOR ART DOCUMENTS

Patent Documents

Japanese Patent No. 4771204

DETAILED DESCRIPTION OF THE INVENTION

Technical Problem

The present disclosure is to provide a polyester resin blend excellent in transparency and processability.

Technical Solution

In the present disclosure, there is provided a polyester resin blend including polyethylene terephthalate; a first polyester resin having a structure in which an acid moiety derived from a dicarboxylic acid or a derivative thereof and a diol moiety derived from a diol containing ethylene glycol and a comonomer are repeated by polymerizing a dicarboxylic acid or a derivative thereof and a diol containing ethylene glycol and a comonomer including isosorbide; and a second polyester resin having a structure in which an acid moiety derived from a dicarboxylic acid or a derivative thereof and a diol moiety derived from a diol containing cyclohexanedimethanol are repeated by polymerizing a dicarboxylic acid or a derivative thereof and a diol containing cyclohexanedimethanol.

Advantageous Effects

The polyester resin blend according to an embodiment of the present disclosure exhibits excellent miscibility even if it contains recycled polyethylene terephthalate as well as virgin polyethylene terephthalate, and can provide molded articles with high transparency.

DETAILED DESCRIPTION OF THE EMBODIMENTS

Hereinafter, the polyester resin blend according to a specific embodiment of the present disclosure will be described.

The terminology used herein is for the purpose of describing particular embodiments only and is not intended to be limiting of the invention. The singular forms are intended to include the plural forms as well, unless the context clearly indicates otherwise. The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

According to an embodiment of the present disclosure, there is provided a polyester resin blend including polyethylene terephthalate; a first polyester resin having a structure in which an acid moiety derived from a dicarboxylic acid or a derivative thereof and a diol moiety derived from a diol containing ethylene glycol and a comonomer are repeated by polymerizing a dicarboxylic acid or a derivative thereof and a diol containing ethylene glycol and a comonomer including isosorbide; and a second polyester resin having a structure in which an acid moiety derived from a dicarboxylic acid or a derivative thereof and a diol moiety derived from a diol containing cyclohexanedimethanol are repeated by polymerizing a dicarboxylic acid or a derivative thereof and a diol containing cyclohexanedimethanol.

In the present disclosure, the polyester resin is obtained by polymerizing a dicarboxylic acid or a derivative thereof and a diol, and has a structure in which an acid moiety derived from a dicarboxylic acid or a derivative thereof and a diol moiety derived from a diol are repeated. When a diol moiety derived from isosorbide is included by using a diol containing isosorbide as the diol, it is called a first polyester resin, and when a diol moiety derived from cyclohexanedimethanol is included by using a diol containing cyclohexanedimethanol not isosorbide as the diol, it is called a second polyester resin.

As used herein, the term 'dicarboxylic acid or a derivative thereof' means at least one compound selected from a dicarboxylic acid and derivatives of the dicarboxylic acid. In addition, the term 'derivative of the dicarboxylic acid' means an alkyl ester of dicarboxylic acid (C1 to C4 lower alkyl ester such as monomethyl ester, monoethyl ester, dimethyl ester, diethyl ester, dibutyl ester, or the like) or a dicarboxylic acid anhydride. Accordingly, for example, the terephthalic acid or the derivative thereof commonly includes a compound that reacts with a diol to form a terephthaloyl moiety, such as terephthalic acid; monoalkyl or dialkyl terephthalate; and terephthalic acid anhydride.

In the present disclosure, the acid moiety and the diol moiety refer to a residue remaining after the dicarboxylic acid or a derivative thereof and the diol are polymerized to remove hydrogen, hydroxyl or alkoxy groups from them.

The polyethylene terephthalate is widely used commercially due to its low price and excellent physical/chemical properties, but it has high crystallinity. Therefore, it requires a high temperature during processing, and has a limitation in providing a transparent product due to its high crystallization rate. Accordingly, a technique of blending a polyester resin containing a diol moiety derived from a comonomer such as cyclohexanedimethanol with polyethylene terephthalate has been used. However, the polyester resin could not exhibit excellent miscibility due to a low trans-esterification level, because it has a structural difference from polyethylene terephthalate.

The present inventors have researched to solve this problem, and found that blending polyester terephthalate and a second polyester resin containing a diol moiety derived from cyclohexanedimethanol with a first polyester resin containing a diol moiety derived from isosorbide can improve the trans-esterification level, and provide a transparent polyester resin blend with excellent processability, thereby completing the present invention.

Hereinafter, the polyester resin blend will be described in detail.

The first polyester resin according to the embodiment may be blended with various general-purpose polyethylene terephthalates and second polyester resins to improve their transparency and processability.

Accordingly, the type of the polyethylene terephthalate is not particularly limited. For example, the polyethylene terephthalate is prepared by polymerizing a dicarboxylic acid or a derivative thereof and a diol, and the dicarboxylic acid or a derivative thereof may be mainly terephthalic acid or a derivative thereof and the diol may be mainly ethylene glycol.

The polyethylene terephthalate may include an acid moiety derived from a comonomer other than terephthalic acid or a derivative thereof. Specifically, the comonomer may be at least one selected from the group consisting of a C8-C14 aromatic dicarboxylic acid or a derivative thereof, and a C4-C12 aliphatic dicarboxylic acid or a derivative thereof. Examples of the C8-C14 aromatic dicarboxylic acid or the derivative thereof may include aromatic dicarboxylic acids or derivatives thereof that are generally used in manufacture of the polyester resin, for example, naphthalene dicarboxylic acid such as isophthalic acid, dimethyl isophthalate, phthalic acid, dimethyl phthalate, phthalic acid anhydride, 2,6-naphthalene dicarboxylic acid, etc., dialkylnaphthalene dicarboxylate such as dimethyl 2,6-naphthalene dicarboxylate, etc., diphenyl dicarboxylic acid, etc. Examples of the C4-C12 aliphatic dicarboxylic acid or the derivative thereof may include linear, branched or cyclic aliphatic dicarboxylic acids or derivatives thereof that are generally used in manufacture of the polyester resin, for example, cyclohexane dicarboxylic acid such as 1,4-cyclohexane dicarboxylic acid, 1,3-cyclohexane dicarboxylic acid, etc., cyclohexane dicarboxylate such as dimethyl 1,4-cyclohexane dicarboxylate, dimethyl 1,3-cyclohexane dicarboxylate, etc., sebacic acid, succinic acid, isodecylsuccinic acid, maleic acid, maleic anhydride, fumaric acid, adipic acid, glutaric acid, azelaic acid, etc. The comonomer may be used in an amount of 0 to 50 mol %, 0 mol % to 30 mol %, 0 to 20 mol % or 0 to 10 mol % with respect to the total dicarboxylic acid or the derivative thereof.

The polyethylene terephthalate may include a diol moiety derived from a comonomer other than ethylene glycol. Specifically, the comonomer may be a C8-C40, or C8-C33 aromatic diol, a C2-C20, or C2-C12 aliphatic diol, or a mixture thereof. Examples of the aromatic diol may include ethylene oxide and/or propylene oxide-added bisphenol A derivatives such as polyoxyethylene-(n)-2,2-bis(4-hydroxyphenyl)propane, polyoxypropylene-(n)-2,2-bis(4-hydroxyphenyl)propane, or polyoxypropylene-(n)-polyoxyethylene-(n)-2,2-bis(4-hydroxyphenyl)propane (wherein n is the number of polyoxyethylene or polyoxypropylene units, and may be 0 to 10). Examples of the aliphatic diol may include linear, branched or cyclic aliphatic diols such as diethylene glycol, triethylene glycol, propanediol (1,2-propanediol, 1,3-propanediol, etc.), 1,4-butanediol, pentanediol, hexanediol (1,6-hexanediol, etc.), neopentyl glycol (2,2-dimethyl-1,3-propanediol), 1,2-cyclohexanediol, 1,4-cyclohexanediol, 1,2-cyclohexanedimethanol, 1,3-cyclohexanedimethanol, 1,4-cyclohexanedimethanol, tetramethyl cyclobutanediol, etc. The comonomer may be used in an amount of 0 to 50 mol %, 0 mol % to 30 mol %, 0 to 20 mol % or 0 to 10 mol % with respect to the total diol.

The first polyester resin according to the above embodiment may not only supplement physical properties of a blend of virgin polyethylene terephthalate and the second polyester resin, but also supplement poor physical properties of a blend of recycled polyethylene terephthalate and the second polyester resin such as low transparency to a very good level.

The recycled polyethylene terephthalate can be understood to include polyethylene terephthalate collected after use or all obtained therefrom. Specifically, the recycled polyethylene terephthalate may be obtained by separating the collected waste plastics according to a certain standard, pulverizing and washing them and then re-pelletizing them by melt extrusion, or may be obtained by depolymerizing the collected waste plastics to a monomer level and repolymerizing them. The recycled polyethylene terephthalate may be used after re-pelletization and crystallization, or after further polycondensation in a solid state after crystallization depending on a processing method.

The recycled polyethylene terephthalate repolymerized by depolymerizing waste plastics to a monomer level may exhibit good properties that are not easily distinguishable from virgin polyethylene terephthalate. However, recycled polyethylene terephthalate obtained by re-pelletization of waste plastics is less transparent than virgin polyethylene terephthalate and has a very fast crystallization rate, making it difficult to produce transparent containers having an appropriate thickness, even if the recycled polyethylene terephthalate is used alone or mixed with virgin polyethylene terephthalate.

However, the first polyester resin according to an embodiment exhibits excellent miscibility with the blend of recycled polyethylene terephthalate and the second polyester resin, thereby providing a polyester resin blend having high transparency and excellent processability. In particular, the first polyester resin according to an embodiment can provide a high-quality molded article without other additives, because it is highly miscible with recycled polyethylene terephthalate and the second polyester resin.

Accordingly, virgin polyethylene terephthalate, recycled polyethylene terephthalate, or a mixture thereof may be used as the polyethylene terephthalate.

In particular, the polyester resin blend according to an embodiment may exhibit high transparency and excellent processability by including a resin having an intrinsic viscosity of 0.6 to 0.8 dl/g among the recycled polyethylene terephthalate.

In addition, the polyester resin blend according to the above embodiment may exhibit high transparency and excellent processability by including a resin containing 95 mol % or more of an acid moiety derived from terephthalic acid and 95 mol % or more of a diol moiety derived from ethylene glycol among the recycled polyethylene terephthalate. Since the resin may be a homopolymer made of terephthalic acid and ethylene glycol, the upper limits of the acid moiety derived from terephthalic acid and the diol moiety derived from ethylene glycol are 100 mol %. When the acid moiety derived from terephthalic acid or the diol moiety derived from ethylene glycol is less than 100 mol %, the acid moiety or the diol moiety derived from the comonomer described above may be included within 5 mol %. Specifically, an acid moiety derived from isophthalic acid and/or a diol moiety derived from cyclohexanedimethanol may be included within 5 mol %, respectively.

The polyester resin blend may include recycled polyethylene terephthalate having a crystallization temperature of 130° C. to 160° C. to exhibit excellent processability.

The polyester resin blend may include recycled polyethylene terephthalate having a melting temperature of 250° C. or higher to provide a polyester resin blend having a melting temperature that is easy to process.

It is advantageous for the first polyester resin according to the embodiment to have high transparency to provide a highly transparent molded article by blending with polyethylene terephthalate and the second polyester resin. Specifically, the polyester resin may have a haze of 5% or less, 4.5% or less, 4% or less, 3.5% or less, 3% or less, 2.5% or less, or 2% or less, when measured for a 6 mm thick specimen according to ASTM D1003-97. As the haze is most preferably 0% in theory, the lower limit may be 0% or more.

The first polyester resin may have a melting temperature of 210 to 245° C., 220 to 240° C., or 230 to 235° C. when measured after crystallization at 180° C. for 100 minutes to exhibit excellent processability by blending with polyethylene terephthalate and the second polyester resin.

The first polyester resin has both crystalline and amorphous properties, and may exhibit crystalline or amorphous properties depending on the environment. The first polyester resin may be a crystalline resin exhibiting crystallinity under the conditions of manufacturing, processing or molding a polyester resin blend. However, the present disclosure is not limited thereto, and the first polyester resin may be an amorphous resin as long as it can achieve desired properties by blending with polyethylene terephthalate and the second polyester resin.

For example, the first polyester resin may be a crystalline resin to exhibit excellent processability by blending with polyethylene terephthalate and the second polyester resin, and a crystallization half-time may be 7 minutes to 95 minutes, 7 to 80 minutes, 7 to 70 minutes, 7 to 60 minutes, 10 to 95 minutes, 30 to 95 minutes, 40 to 95 minutes, 10 to 80 minutes, 30 to 70 minutes, 30 to 60 minutes or 40 to 60 minutes.

The first polyester resin includes a diol moiety derived from a diol containing ethylene glycol and a comonomer, and the diol moiety derived from the comonomer may be included in 5 to 20 mol % with respect to the total diol moiety. Further, the comonomer may exhibit the above-described properties as it includes isosorbide (1,4:3,6-dianhydroglucitol).

When the diol moiety derived from the comonomer is less than 5 mol %, it is difficult to improve processability of polyethylene terephthalate and the second polyester resin to an appropriate level. When the diol moiety derived from the comonomer exceeds 20 mol %, the first polyester resin exhibits amorphousness and can be easily fused in a processing or molding process. In addition, miscibility with polyethylene terephthalate and the second polyester resin can be reduced.

The first polyester resin may include 5 to 15 mol %, 7 to 15 mol %, 8 to 15 mol % 10 to 15 mol %, 9 to 12 mol % or 10 to 12 mol % of the diol moiety derived from the comonomer with respect to the total diol moiety in order to exhibit better miscibility with recycled polyethylene terephthalate and the second polyester resin.

The first polyester resin essentially includes a diol moiety derived from isosorbide as a diol moiety derived from a comonomer, and this structure may improve miscibility with polyethylene terephthalate and the second polyester resin.

The first polyester resin may include 0.1 to 15 mol %, in particular 0.1 to 12 mol %, 3 to 12 mol %, 5 to 12 mol %, or 7 to 11 mol % of a diol moiety derived from isosorbide with respect to the total diol moiety to maximize the properties described above.

Meanwhile, the comonomer other than ethylene glycol may further include cyclohexanedimethanol in addition to isosorbide. The cyclohexanedimethanol may be used in an amount of 0.1 to 15 mol % with respect to the total diol to provide the first polyester resin having the above-described properties.

When isosorbide and cyclohexanedimethanol are used as comonomers, they may be used in a ratio of 1:2 to 5 mol, or 1:2 to 4 mol to ensure better physical properties.

The comonomer other than ethylene glycol may include a diol generally used in manufacture of the polyester resin in addition to the monomers described above. Specific examples of the diol may include diols listed that can be used in the above-described polyethylene terephthalate. However, it is advantageous for the comonomer other than ethylene glycol to be isosorbide or a combination of isosorbide and cyclohexanedimethanol to satisfy the physical properties described above. When the comonomer includes a diol other than isosorbide and cyclohexanedimethanol, its content may be 10 mol % or less, 5 mol % or less, or 2 mol % or less with respect to the total comonomer.

In the first polyester resin, a dicarboxylic acid or a derivative thereof may be mainly terephthalic acid or a derivative thereof like polyethylene terephthalate described above, and the polyester resin may include a comonomer other than terephthalic acid or a derivative thereof. The type and content of the comonomer can be adjusted by referring to the type and content of the comonomer that can be used for the above-described polyethylene terephthalate.

The second polyester resin according to the embodiment includes a diol moiety derived from a diol containing cyclohexanedimethanol. The first polyester resin according to the embodiment may improve miscibility of various second polyester resins including a diol moiety derived from a wide range of cyclohexanedimethanol to provide a polyester resin blend having excellent processability. Accordingly, the second polyester resin may include 0.1 to 100 mol % of the diol moiety derived from cyclohexanedimethanol with respect to the total diol moiety, and the remaining diol moiety may be a diol moiety derived from ethylene glycol. However, the present disclosure is not limited thereto, and a diol moiety derived from a diol generally used in manufacture of the polyester resin may be included. Specific examples of the diol may include diols listed that can be used in the above-described polyethylene terephthalate. When the second polyester resin includes a diol moiety derived from a diol other than cyclohexanedimethanol and ethylene glycol, its content may be 10 mol % or less, 5 mol % or less, or 2 mol % or less with respect to the total diol moiety.

Meanwhile, the polyester resin produced by polymerizing a dicarboxylic acid or a derivative thereof and a diol containing ethylene glycol may include a diol moiety derived from diethylene glycol introduced by reacting two ethylene glycols to form diethylene glycol, and reacting the diethylene glycol with a dicarboxylic acid or a derivative thereof. Accordingly, unless otherwise specified, the diol moiety derived from ethylene glycol can be understood to include a diol moiety derived from diethylene glycol.

In the second polyester resin, a dicarboxylic acid or a derivative thereof may be mainly terephthalic acid or a derivative thereof like polyethylene terephthalate described above, and the polyester resin may include a comonomer other than terephthalic acid or a derivative thereof. The type and content of the comonomer can be adjusted by referring to the type and content of the comonomer that can be used for the above-described polyethylene terephthalate.

The polyester resin blend according to the embodiment may include two or more types of polyester resins including a diol moiety derived from cyclohexanedimethanol in different contents as the second polyester resin.

For example, the polyester resin blend may include a third polyester resin containing 0.1 mol % or more and less than 50 mol % of a diol moiety derived from cyclohexanedimethanol with respect to the total diol moiety, and a fourth polyester resin containing 50 mol % or more of a diol moiety derived from cyclohexanedimethanol with respect to the total diol moiety.

The third polyester resin may improve transparency of the polyester resin blend, and may contain 40 mol % or less, 35 mol % or less, 31 mol % or less, or 30 mol % or less, and 0.1 mol % or more, 5 mol % or more, 10 mol % or more, 15 mol % or more, 20 mol % or more, or 25 mol % or more of a diol moiety derived from cyclohexanedimethanol with respect to the total diol moiety.

In addition, the fourth polyester resin may contain 50 mol % or more, or 55 mol % or more, and 100 mol % or less, or 60 mol % or less of a diol moiety derived from cyclohexanedimethanol with respect to the total diol moiety.

As the first polyester resin can improve miscibility with polyethylene terephthalate and the second polyester resin regardless of the content of the diol moiety derived from cyclohexanedimethanol contained in the second polyester resin, the polyester resin blend may include various second polyester resins to achieve desired physical properties.

Meanwhile, the first and second polyester resins may be prepared including the steps of performing an esterification reaction or a transesterification reaction on the above-described dicarboxylic acid or a derivative thereof and the above-described diol; and performing a polycondensation reaction on a product obtained by the esterification or transesterification reaction. Hereinafter, a method of manufacturing a polyester resin will be described in detail as an example of a method of manufacturing the first and second polyester resins.

A catalyst may be used in the esterification or transesterification reaction. Such catalyst may include methylates of sodium and magnesium; acetates, borates, fatty acids, or carbonates of Zn, Cd, Mn, Co, Ca, Ba and the like; metals such as Mg; and oxides of Pb, Zn, Sb, Ge and the like.

The esterification or transesterification reaction may be carried out in a batch, semi-continuous or continuous manner. Each raw material may be added separately, but it may preferably be added in a slurry form in which the dicarboxylic acid or the derivative thereof is mixed in the diol.

A polycondensation catalyst, a stabilizer, a coloring agent, a crystallizing agent, an antioxidant, a branching agent and the like may be added in the slurry before the esterification or transesterification reaction or in the product after completion of the reaction.

However, the input timing of the above-described additive is not limited thereto, and the above-described additive may be added at any time during the preparation of the polyester resin. As the polycondensation catalyst, at least one of conventional titanium, germanium, antimony, aluminum, tin-based compounds may be appropriately selected and used. Examples of the preferable titanium-based catalyst include tetraethyl titanate, acetyltripropyl titanate, tetrapropyl titanate, tetrabutyl titanate, polybutyl titanate, 2-ethylhexyl titanate, octylene glycol titanate, lactate titanate, triethanolamine titanate, acetylacetonate titanate, ethyl acetoacetic ester titanate, isostearyl titanate, titanium dioxide, titanium dioxide/silicon dioxide copolymer, titanium dioxide/zirconium dioxide copolymer, and the like. In addition, examples of the preferable germanium-based catalyst include germanium dioxide and a copolymer thereof. As the stabilizer, phosphorus-based compounds such as phosphoric acid, trimethyl phosphate, and triethyl phosphate may be generally used, and an added content thereof may be 10 to 200 ppm with respect to a weight of the final polymer (polyester resin) based on a phosphorus atom. When the content of the stabilizer is less than 10 ppm, the polyester resin may not be sufficiently stabilized and a color of the polyester resin may become yellow. When the content is more than 200 ppm, a polymer having a high degree of polymerization may not be obtained. Further, examples of the coloring agent to be added for improving a color of the polymer may include conventional cobalt-based coloring agents such as cobalt acetate, cobalt propionate, and the like. An added content thereof may be 1 to 200 ppm with respect to a weight of the final polymer (polyester resin) based on a cobalt atom. If necessary, anthraquionone-based compounds, perinone-based compounds, azo-based compounds, methine-based compounds, and the like may be used as an organic coloring agent, and commercially available products include toners such as Polysynthren Blue RLS (manufactured by Clarient) and Solvaperm Red BB (manufactured by Clarient). An added content of the organic coloring agent may be 0 to 50 ppm with respect to a weight of the final polymer. When the coloring agent is used in the content out of the above-described range, a yellow color of the polyester resin may not be sufficiently covered or physical properties may be reduced.

Examples of the crystallizing agent may include a crystal nucleating agent, an ultraviolet absorber, a polyolefin-based resin, a polyamide resin, and the like. Examples of the antioxidant may include a hindered phenolic antioxidant, a phosphite-based antioxidant, a thioether-based antioxidant, and a mixture thereof. The branching agent is a common branching agent having at least three functional groups, and examples thereof may include trimellitic anhydride, trimethylol propane, trimellitic acid, or a mixture thereof.

Moreover, the esterification reaction may be carried out at a temperature of 200 to 300° C. or 230 to 280° C., and under a pressure of 0 to 10.0 kgf/cm$^2$ (0 to 7355.6 mmHg), 0 to 5.0 kgf/cm$^2$ (0 to 3677.8 mmHg) or 0.1 to 3.0 kgf/cm$^2$ (73.6 to 2206.7 mmHg). And the transesterification reaction may be carried out at a temperature of 150 to 270° C. or 180 to 260° C., and under a pressure of 0 to 5.0 kgf/cm$^2$ (0 to 3677.8 mmHg) or 0.1 to 3.0 kgf/cm$^2$ (73.6 to 2206.7 mmHg). The pressures outside the parentheses refer to gauge pressures (expressed in kgf/cm$^2$) and the pressures inside parentheses refer to absolute pressures (expressed in mmHg).

When the reaction temperature and pressure are out of the above range, physical properties of the polyester resin may be lowered. The reaction time (average residence time) is usually 1 to 24 hours, or 2 to 8 hours, and may vary depending on the reaction temperature, pressure, and molar ratio of the diol to the dicarboxylic acid or the derivative thereof used.

The product obtained by the esterification or transesterification reaction may be subjected to a polycondensation reaction to prepare a polyester resin having a high degree of polymerization. Generally, the polycondensation reaction may be carried out at a temperature of 150 to 300° C., 200 to 290° C. or 260 to 290° C., and under a reduced pressure of 400 to 0.01 mmHg, 100 to 0.05 mmHg, or 10 to 0.1 mmHg. Herein, the pressures refer to absolute pressures. The reduced pressure of 400 to 0.01 mmHg is for removing by-products and unreacted materials. Therefore, when the pressure is out of the above range, the removal of by-products and unreacted materials may be insufficient. In addition, when the temperature of the polycondensation reaction is out of the above range, physical properties of the polyester resin may be lowered. The polycondensation reaction may be carried out for the required time until the desired intrinsic viscosity is reached, for example, for an average residence time of 1 to 24 hours.

It is suitable that an intrinsic viscosity of the polymer obtained after the polycondensation reaction is 0.30 to 1.0 dl/g. When the intrinsic viscosity is less than 0.30 dl/g, a reaction rate of the solid-phase reaction may be significantly lowered. When the intrinsic viscosity exceeds 1.0 dl/g, a viscosity of a molten material may be increased during the melt polymerization, and thus a possibility of polymer discoloration may be increased by shear stress between a stirrer and the reactor, resulting in by-products such as acetaldehyde.

The polyester resin may have a higher degree of polymerization by further performing a solid-phase reaction after the polycondensation reaction, if necessary.

Specifically, the polymer obtained by the polycondensation reaction is discharged out of the reactor to perform granulation. The granulation may be performed by a strand cutting method in which the polymer is extruded into a strand shape, solidified in a cooling liquid, and cut with a cutter, or an underwater cutting method in which a die hole is immersed in a cooling liquid, the polymer is directly extruded into the cooling liquid and cut with a cutter. In general, a temperature of the cooling liquid should be kept low in the strand cutting method to solidify the strand well, so that there is no problem in cutting. In the underwater cutting method, it is preferable to maintain the temperature of the cooling liquid in accordance with the polymer to make the shape of the polymer uniform. However, in the case of a crystalline polymer, the temperature of the cooling liquid may be intentionally kept high in order to induce crystallization during the discharge.

It is possible to remove raw materials soluble in water among unreacted raw materials by water-washing the granulated polymer. The smaller the particle size, the wider the surface area relative to a weight of particles. Accordingly, it is advantageous that a particle size is small. In order to achieve this purpose, the particles may be made to have an average weight of about 15 mg or less. For example, the granulated polymer may be water-washed by leaving it in water at a temperature equal to the glass transition temperature of the polymer or lower than that by about 5 to 20° C. for 5 minutes to 10 hours.

The granulated polymer is subjected to a crystallization step to prevent fusion during the solid-phase reaction. The crystallization step may be performed under an atmosphere, inert gas, water vapor, or water vapor-containing inert gas or in solution, and may be performed at 110 to 210° C. or 120 to 210° C. When the temperature is low, a rate at which crystals of the particles are formed may be excessively slow. When the temperature is high, a rate at which a surface of the particles is melted may be faster than a rate at which the crystals are formed, so that the particles may adhere to each other to cause fusion. Since the heat resistance of the particles is increased as the particles are crystallized, it is also possible to crystallize the particles by dividing the crystallization into several steps and raising the temperature stepwise.

The solid-phase reaction may be performed under an inert gas atmosphere such as nitrogen, carbon dioxide, argon, and the like or under a reduced pressure of 400 to 0.01 mmHg and at a temperature of 180 to 220° C. for an average residence time of 1 to 150 hours. By performing the solid-phase reaction, the molecular weight may be additionally increased, and the raw materials that do not react in the melting reaction but just remain, and a cyclic oligomer, acetaldehyde, and the like that are generated during the reaction may be removed.

The solid-phase reaction may be performed until the intrinsic viscosity of the crystallized polymer reaches 0.65 dl/g or more, 0.70 dl/g or more, 0.75 dl/g or more, or 0.80 dl/g or more, wherein the intrinsic viscosity is measured at 35° C. after dissolving the polymer at a concentration of 1.2 g/dl in orthochlorophenol at 150° C. for 15 minutes.

As the first polyester resin can improve transparency and processability of the polyethylene terephthalate and the second polyester resin blended in various ratios, the polyester resin blend may be provided by blending the polyethylene terephthalate, the first and second polyester resins in various ratios in order to achieve desired properties. For example, the polyester resin blend may include 5 wt % or more, 10 wt % or more, or 15 wt % or more, and 50 wt % or less, 40 wt % or less, or 30 wt % or less of polyethylene terephthalate, 5 wt % or more, 10 wt % or more, 15 wt % or more, 20 wt % or more, or 30 wt % or more, and 90 wt % or less, 80 wt % or less, or 70 wt % or less of the first polyester resin, and 1 wt % or more, 5 wt % or more, 10 wt % or more, or 20 wt % or more, and 80 wt % or less, 70 wt % or less, 60 wt % or less, or 50 wt % or less of the second polyester resin with respect to the total solids. The content of the total solids is a total weight of the solid components included in the polyester resin blend, and may be, for example, a total weight of polyethylene terephthalate, the first polyester resin and the second polyester resin.

When the polyester resin blend includes a third polyester resin and a fourth polyester resin as the second polyester resin, it may include 5 wt % or more, 10 wt % or more, or 15 wt % or more, and 50 wt % or less, 40 wt % or less, or 30 wt % or less of polyethylene terephthalate, 5 wt % or more, 10 wt % or more, 15 wt % or more, 20 wt % or more, or 30 wt % or more, and 90 wt % or less, 80 wt % or less, or 70 wt % or less of the first polyester resin, 1 wt % or more, 5 wt % or more, 10 wt % or more, or 20 wt % or more, and 80 wt % or less, 70 wt % or less, 60 wt % or less, or 50 wt % or less of the third polyester resin, and 1 wt % or more, 5 wt % or more, 10 wt % or more, or 20 wt % or more, and 80 wt % or less, 70 wt % or less, 60 wt % or less, or 50 wt % or less of the fourth polyester resin with respect to the total solids.

Meanwhile, the polyester resin blend according to the embodiment may exhibit excellent miscibility. In the present disclosure, a trans-esterification level is used for evaluating miscibility of the polyester resin blend. Specifically, the trans-esterification level can be confirmed by evaluating a melting temperature (referred to as a first melting temperature) appearing during the first scan of the polyester resin blend with differential scanning calorimetry (DSC). It can be evaluated that the lower the first melting temperature is, the higher the trans-esterification level between the polyester resins in the blend is, indicating excellent miscibility. However, when the first melting temperature is too low, physical properties of the polyester resin blend are poor, so the first melting temperature of the polyester resin blend is preferably 225° C. to 245° C., 225° C. to 242° C., 230° C. to 242° C. or 230° C. to 240° C. The polyester resin blend may exhibit excellent processability by exhibiting a melting temperature in the above-described range even if it includes recycled polyethylene terephthalate.

Meanwhile, the polyester resin blend may have a haze of 5% or less, 4.5% or less, 4% or less, 3.5% or less, 3% or less, 2.5% or less, 2% or less, or 1% or less when measured for a 6 mm thick specimen according to ASTM D1003-97, indicating high transparency. As the haze is most preferably 0% in theory, the lower limit may be 0% or more.

Meanwhile, the polyester resin blend according to the embodiment may be crystalline or amorphous. When the polyester resin blend is amorphous, it may be crystallized by a crystallization process to have crystallinity, if necessary.

Even if the polyester resin blend according to the embodiment includes recycled polyethylene terephthalate, miscibility of the first and second polyester resins with the recycled polyethylene terephthalate is excellent, and thus there is an advantage that no additive is required to supplement properties of the recycled polyethylene terephthalate. However, as a non-limiting example, the polyester resin blend may include an additive commonly applied in the art.

The polyester resin blend according to the above embodiment is capable of providing highly transparent molded articles with excellent miscibility even if it includes recycled polyethylene terephthalate as well as virgin polyethylene terephthalate.

Hereinafter, action and effects of the present disclosure are described by specific Examples in more detail. Meanwhile, these Examples are provided by way of example, and therefore, should not be construed as limiting the scope of the present invention.

The following physical properties were measured according to the following methods.

(1) Intrinsic Viscosity (IV)

After dissolving a sample in o-chlorophenol at 150° C. for 15 minutes at a concentration of 1.2 g/dl, the intrinsic viscosity of the sample was measured using an Ubbelohde viscometer. Specifically, a temperature of the viscometer was maintained at 35° C., and the time taken (efflux time; $t_0$) for a solvent to pass between certain internal sections of the viscometer and the time taken (t) for a solution to pass the viscometer were measured. Subsequently, a specific viscosity was calculated by substituting $t_0$ and t into Formula 1, and the intrinsic viscosity was calculated by substituting the calculated specific viscosity into Formula 2.

$$\eta_{sp} = \frac{t - t_0}{t_0} \quad \text{[Formula 1]}$$

$$[\eta] = \frac{\sqrt{1 + 4A\eta_{sp}} - 1}{2Ac} \quad \text{[Formula 2]}$$

In Formula 2, A was a Huggins constant of 0.247, and c was a concentration of 1.2 g/dl.

(2) First Melting Temperature (Tm)

The first melting temperature of pellets prepared from the polyester resin blend was measured by differential scanning calorimetry (DSC). DSC 1 model manufactured by Mettler Toledo was used as a measuring device. Specifically, the pellets were dried for 6 to 12 hours under a nitrogen atmosphere at 65° C. using a dehumidifying dryer (D2T manufactured by Moretto). Therefore, the melting temperature was measured in a state in which a moisture content remaining in the pellets was less than 500 ppm. About 6 to 10 mg of the dried pellets were taken, filled in an aluminum pan, maintained at a temperature of 30° C. for 3 minutes, heated at a rate of 10° C./min from 30° C. to 280° C., and maintained at a temperature of 280° C. for 3 minutes (1st scan). Then, the Tm peak value was analyzed in the first scan by DSC using an integration function in TA menu of the related program (STARe software) provided by Mettler Toledo. The temperature range of the first scan was set from onset point−10° C. to Tm peak+10° C., which was calculated by the program.

(3) Visual Haze

In order to confirm that polyethylene terephthalate, the first and second polyester resins were well blended, the haze of pellets prepared from the polyester resin blend was visually observed in an environment with and without a light source. When no haze was observed, it can be evaluated that the first polyester resin improves miscibility between the polyethylene terephthalate and the second polyester resin, and the polyester resin blend is well blended.

Specifically, the haze of pellets prepared in one of Examples and Comparative Examples was visually observed. When no haze was observed and the pellets were transparent, it was indicated as 'no haze'. When haze was slightly observed, it was indicated as 'slightly haze', and when haze was observed and the pellets were opaque, it was indicated as 'haze'. When it was ambiguous to distinguish between 'slightly haze' and 'haze', it was evaluated according to the following criteria. When the color L value of the pellets prepared in one of Examples and Comparative Examples measured using a colorimeter rose by less than 5 compared to the color L value of the resin pellets having the highest color L value among the first and second polyester resins included in the polyester resin blend, it was indicated as 'slightly haze', and when rose by 5 or more, it was indicated as 'haze'.

(4) 6T Haze

A specimen having a thickness of 6 mm was prepared using a polyester resin blend, and the haze of the specimen was measured using CM-3600A manufactured by Minolta according to ASTM D1003-97.

Preparation Example 1: Preparation of First Polyester Resin 3189.1 g (19.2 mol) of terephthalic acid, 1334.1 g (21.5 mol) of ethylene glycol, and 504.9 g (3.5 mol) of isosorbide were placed in a 10 L reactor to which a column, and a condenser capable of being cooled by water were connected, and 1.0 g of $GeO_2$ as a catalyst, 1.46 g of phosphoric acid as a stabilizer, and 0.7 g of cobalt acetate as a coloring agent were used. Then, nitrogen was injected into the reactor to form a pressurized state in which the pressure of the reactor was higher than normal pressure by 1.0 kgf/cm² (absolute pressure: 1495.6 mmHg).

Then, the temperature of the reactor was raised to 220° C. over 90 minutes, maintained at 220° C. for 2 hours, and then raised to 260° C. over 2 hours. Thereafter, an esterification reaction proceeded until the mixture in the reactor became transparent with the naked eye while maintaining the temperature of the reactor at 260° C. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the pressure of the reactor was reduced from normal pressure to 5 Torr (absolute pressure: 5 mmHg) over 30 minutes, and the temperature of the reactor was raised to 280° C. over 1 hour to proceed a polycondensation reaction while maintaining the pressure of the reactor at 1 Torr (absolute pressure: 1 mmHg) or less. In the initial stage of the polycondensation reaction, a stirring rate was set high, but when the stirring force is weakened due to an increase in the viscosity of the reactant as the polycondensation reaction progresses or the temperature of the reactant rises above the set temperature, the stirring rate may be appropriately adjusted. The polycondensation reaction was performed until an intrinsic viscosity (IV) of the mixture (melt) in the reactor became 0.50 dl/g. When the intrinsic viscosity of the mixture in the reactor reached a desired level, the mixture was discharged out of the reactor and stranded. This was solidified with a cooling liquid and granulated to have an average weight of about 12 to 14 mg. The particles thus obtained were stored in water at 70° C. for 5 hours to remove unreacted raw materials contained in the particles.

The particles were allowed to stand at 150° C. for 1 hour to crystallize, and then put into a 20 L solid-phase polymerization reactor. Then, nitrogen was flowed into the reactor at a rate of 50 L/min. Herein, the temperature of the reactor was raised from room temperature to 140° C. at a rate of 40° C./hour, and maintained at 140° C. for 3 hours. Thereafter, the temperature was further raised to 200° C. at a rate of 40° C./hour, and maintained at 200° C. The solid-phase polymerization reaction was performed until the intrinsic viscosity of the particles in the reactor reached 0.95 dl/g.

A content of a diol moiety derived from isosorbide with respect to the total diol moiety contained in the polyester resin was 10 mol %.

Preparation Example 2: Preparation of Third Polyester Resin 2950 g (17.8 mol) of terephthalic acid, 1047 g (16.9 mol) of ethylene glycol, and 767.9 g (5.3 mol) of 1,4-cyclohexanedimethanol were placed in a 10 L reactor to which a column, and a condenser capable of being cooled by water were connected, and 1.0 g of GeO$_2$ as a catalyst, 1.46 g of phosphoric acid as a stabilizer, and 1.1 g of cobalt acetate as a coloring agent were used. Then, nitrogen was injected into the reactor to form a pressurized state in which the pressure of the reactor was higher than normal pressure by 1.0 kgf/cm$^2$ (absolute pressure: 1495.6 mmHg).

Then, the temperature of the reactor was raised to 220° C. over 90 minutes, maintained at 220° C. for 2 hours, and then raised to 250° C. over 2 hours. Thereafter, the temperature of the reactor was maintained at 250° C. until the mixture in the reactor became transparent with the naked eye. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the pressure of the reactor was reduced from normal pressure to 5 Torr (absolute pressure: 5 mmHg) over 30 minutes, and the temperature of the reactor was raised to 265° C. over 1 hour to proceed a polycondensation reaction while maintaining the pressure of the reactor at 1 Torr (absolute pressure: 1 mmHg) or less. In the initial stage of the polycondensation reaction, a stirring rate was set high, but when the stirring force is weakened due to an increase in the viscosity of the reactant as the polycondensation reaction progresses or the temperature of the reactant rises above the set temperature, the stirring rate may be appropriately adjusted. The polycondensation reaction was performed until an intrinsic viscosity (IV) of the mixture (melt) in the reactor became 0.80 dl/g. When the intrinsic viscosity of the mixture in the reactor reached a desired level, the mixture was discharged out of the reactor and stranded. This was solidified with a cooling liquid and granulated to have an average weight of about 12 to 14 mg. The particles thus obtained were stored in water at 70° C. for 5 hours to remove unreacted raw materials contained in the particles.

A content of a diol moiety derived from 1,4-cyclohexanedimethanol with respect to the total diol moiety contained in the polyester resin was 30 mol %.

Preparation Example 3: Preparation of Fourth Polyester Resin 2951 g (17.8 mol) of terephthalic acid, 827 g (23.3 mol) of ethylene glycol, and 1280 g (8.9 mol) of 1,4-cyclohexanedimethanol were placed in a 10 L reactor to which a column, and a condenser capable of being cooled by water were connected, and 1.0 g of GeO$_2$ as a catalyst, 1.46 g of phosphoric acid as a stabilizer, and 1.1 g of cobalt acetate as a coloring agent were used. Then, nitrogen was injected into the reactor to form a pressurized state in which the pressure of the reactor was higher than normal pressure by 1.0 kgf/cm$^2$ (absolute pressure: 1495.6 mmHg).

Then, the temperature of the reactor was raised to 220° C. over 90 minutes, maintained at 220° C. for 2 hours, and then raised to 250° C. over 2 hours. Thereafter, the temperature of the reactor was maintained at 250° C. until the mixture in the reactor became transparent with the naked eye. When the esterification reaction was completed, the nitrogen in the pressurized reactor was discharged to the outside to lower the pressure of the reactor to normal pressure, and then the mixture in the reactor was transferred to a 7 L reactor capable of vacuum reaction.

Then, the pressure of the reactor was reduced from normal pressure to 5 Torr (absolute pressure: 5 mmHg) over 30 minutes, and the temperature of the reactor was raised to 265° C. over 1 hour to proceed a polycondensation reaction while maintaining the pressure of the reactor at 1 Torr (absolute pressure: 1 mmHg) or less. In the initial stage of the polycondensation reaction, a stirring rate was set high, but when the stirring force is weakened due to an increase in the viscosity of the reactant as the polycondensation reaction progresses or the temperature of the reactant rises above the set temperature, the stirring rate may be appropriately adjusted. The polycondensation reaction was performed until an intrinsic viscosity (IV) of the mixture (melt) in the reactor became 0.70 dl/g.

A content of a diol moiety derived from 1,4-cyclohexanedimethanol with respect to the total diol moiety contained in the polyester resin was 50 mol %.

In the polyester resins prepared in Preparation Examples 1 to 3, the remaining diol moiety except for the diol moiety derived from isosorbide or the diol moiety derived from 1,4-cyclohexanedimethanol is derived from ethylene glycol. The diol moiety derived from ethylene glycol may include a diol moiety derived from diethylene glycol introduced by reacting two ethylene glycols to form diethylene glycol, and reacting the diethylene glycol with a dicarboxylic acid or a derivative thereof.

Examples and Comparative Examples: Preparation of Polyester Resin Blend

The polyester resin prepared in one of Preparation Examples 1 to 3 was melt-blended with recycled PET in a weight ratio shown in Table 1 below to prepare a polyester resin blend. Specifically, recycled PET, which was re-pelletized by melt-extruding flakes obtained by pulverizing and washing waste plastics, was prepared. Thereafter, the recycled PET and the polyester resin prepared in one of Preparation Examples 1 to 3 were blended in a weight ratio shown in Table 1 below, completely melted at about 260° C., and then extruded to obtain a pelletized polyester resin blend.

The composition of the recycled PET may vary depending on where the waste plastics are collected, how to sort the waste plastics, and how to re-pelletize it. The recycled PET used in this experiment is a copolymer of terephthalic acid, isophthalic acid and ethylene glycol, which contains isophthalic acid within 3 mol % with respect to the total dicarboxylic acid, and has an intrinsic viscosity (IV) of 0.75 dl/g, a crystallization temperature of 130° C., and a melting temperature of 250° C.

TABLE 1

|  | Recycled PET | $1^{st}$ polyester resin | $2^{nd}$ polyester resin | |
|---|---|---|---|---|
|  |  |  | $3^{rd}$ polyester resin | $4^{th}$ polyester resin |
| Comp. Ex. 1 | 50 |  | 50 |  |
| Ex. 1 | 50 | 10 | 40 |  |
| Comp. Ex. 2 | 50 |  |  | 50 |
| Ex. 2 | 50 | 10 |  | 40 |
| Comp. Ex. 3 | 47 |  | 3 | 50 |
| Ex. 3 | 47 | 9 | 3 | 41 |
| Comp. Ex. 4 | 30 |  | 70 |  |
| Ex. 4 | 30 | 10 | 60 |  |
| Comp. Ex. 5 | 30 |  | 35 | 35 |
| Ex. 5 | 30 | 10 | 35 | 25 |
| Ex. 6 | 30 | 10 | 30 | 30 |
| Comp. Ex. 6 | 10 |  | 90 |  |
| Ex. 7 | 10 | 10 | 80 |  |
| Comp. Ex. 7 | 30 | 70 |  |  |
| Ex. 8 | 30 | 60 | 10 |  |
| Comp. Ex. 8 | 20 | 80 |  |  |
| Ex. 9 | 20 | 70 | 5 | 5 |
| Comp. Ex. 9 | 50 | 50 |  |  |
| Ex. 10 | 30 | 50 | 10 | 10 |

(unit: parts by weight)

Experimental Example: Evaluation of Physical Properties of Polyester Resin Blend The physical properties of the pellets of the polyester resin blends prepared above were evaluated according to the methods described above, and the results are shown in Table 2.

TABLE 2

|  | $1^{st}$ melting temperature | Visual haze | 6T haze |
|---|---|---|---|
| Comp. Ex. 1 | 240 | no haze | 7 |
| Ex. 1 | 238 | no haze | 3 |
| Comp. Ex. 2 | 240 | haze | 15 |
| Ex. 2 | 240 | slightly haze | 3 |
| Comp. Ex. 3 | 245 | haze | 50 |
| Ex. 3 | 242 | slightly haze | 5 |
| Comp. Ex. 4 | 242 | no haze | 6 |
| Ex. 4 | 238 | no haze | 3 |
| Comp. Ex. 5 | 241 | no haze | 5 |
| Ex. 5 | 235 | no haze | 5 |
| Ex. 6 | 235 | no haze | 5 |
| Comp. Ex. 6 | 220 | haze | 30 |
| Ex. 7 | 230 | slightly haze | 5 |
| Comp. Ex. 7 | 255 | haze | 10 |
| Ex. 8 | 235 | no haze | 5 |
| Comp. Ex. 8 | 240 | haze | 7 |
| Ex. 9 | 230 | no haze | 3 |
| Comp. Ex. 9 | 255 | haze | 50 |
| Ex. 10 | 230 | no haze | 3 |

Referring to Table 2, it was confirmed that when the first polyester resin containing a diol moiety derived from isosorbide is added to the composition according to Comparative Examples 1 to 6 including recycled PET and the second polyester resin containing a diol moiety derived from cyclohexanedimethanol as in Examples 1 to 7, or when the second polyester resin containing a diol moiety derived from cyclohexanedimethanol is added to the composition according to Comparative Examples 7 to 9 including recycled PET and the first polyester resin containing a diol moiety derived from isosorbide as in Examples 8 to 10, the haze of the composition could be lowered and the melting temperature of the composition could be adjusted to a range advantageous for processing.

The invention claimed is:
1. A polyester resin blend, comprising:
recycled polyethylene terephthalate;
a first polyester resin having a structure in which an acid moiety derived from a dicarboxylic acid or a derivative thereof and a diol moiety derived from a diol containing ethylene glycol and isosorbide; and
a second polyester resin having a structure in which an acid moiety derived from a dicarboxylic acid or a derivative thereof and a diol moiety derived from a diol containing cyclohexanedimethanol,
wherein the first polyester resin and the second polyester resin are newly prepared.
2. The polyester resin blend of claim 1,
wherein the recycled polyethylene terephthalate has an intrinsic viscosity of 0.6 to 0.8 dl/g.
3. The polyester resin blend of claim 1,
wherein the recycled polyethylene terephthalate comprises 95 mol % or more of an acid moiety derived from terephthalic acid and 95 mol % or more of a diol moiety derived from ethylene glycol.
4. The polyester resin blend of claim 1,
wherein the first polyester resin comprises 5 to 20 mol % of a diol moiety derived from a comonomer comprising isosorbide with respect to the total diol moiety derived from a diol.
5. The polyester resin blend of claim 4,
wherein the comonomer further comprises cyclohexanedimethanol.
6. The polyester resin blend of claim 5,
wherein the first polyester resin comprises a diol moiety derived from isosorbide and a diol moiety derived from cyclohexanedimethanol in a ratio of 1:2 to 5 mol.

7. The polyester resin blend of claim 1,
wherein the first polyester resin comprises 0.1 to 15 mol % of a diol moiety derived from isosorbide with respect to the total diol moiety derived from a diol.

8. The polyester resin blend of claim 1,
wherein the second polyester resin comprises a third polyester resin containing 0.1 mol % or more and less than 50 mol % of a diol moiety derived from cyclohexanedimethanol with respect to the total diol moiety; and a fourth polyester resin containing 50 mol % or more of a diol moiety derived from cyclohexanedimethanol with respect to the total diol moiety.

9. The polyester resin blend of claim 8,
wherein the polyester resin blend comprises 5 to 50 wt % of polyethylene terephthalate, 5 to 90 wt % of the first polyester resin, 1 to 80 wt % of the third polyester resin and 1 to 80 wt % of the fourth polyester resin with respect to the total solids.

10. The polyester resin blend of claim 1,
wherein the polyester resin blend comprises 5 to 50 wt % of polyethylene terephthalate, 5 to 90 wt % of the first polyester resin and 1 to 80 wt % of the second polyester resin with respect to the total solids.

11. The polyester resin blend of claim 1,
wherein the polyester resin blend has a melting temperature of 225 to 245° C., when measured at the first scan by differential scanning calorimetry.

12. The polyester resin blend of claim 1,
wherein the polyester resin blend has a haze of 5% or less, when measured for a 6 mm thick specimen according to ASTM D1003-97.

* * * * *